US012388697B2

(12) United States Patent
Ringheiser et al.

(10) Patent No.: US 12,388,697 B2
(45) Date of Patent: Aug. 12, 2025

(54) RADIO FREQUENCY INTERFERENCE MITIGATION IN WEATHER SENSING

(71) Applicant: Raytheon Company, Arlington, VA (US)

(72) Inventors: David A. Ringheiser, Bluffton, SC (US); Eric J. Knapp, Amherst, MA (US); Michael D. Dubois, Franklin, MA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/165,267

(22) Filed: Feb. 6, 2023

(65) Prior Publication Data

US 2024/0267271 A1 Aug. 8, 2024

(51) Int. Cl.
*H04L 27/26* (2006.01)

(52) U.S. Cl.
CPC ...... *H04L 27/2613* (2013.01); *H04L 27/2604* (2013.01)

(58) Field of Classification Search
CPC .............. H04L 27/2613; H04L 27/2604
USPC .................................. 375/260, 262
See application file for complete search history.

(56) References Cited

U.S. PATENT DOCUMENTS

| | | | | |
|---|---|---|---|---|
| 5,309,161 A * | 5/1994 | Urkowitz | ............. | G01S 13/288 342/111 |
| 5,416,488 A * | 5/1995 | Grover | .................... | G01S 7/415 342/159 |
| 6,531,976 B1 * | 3/2003 | Yu | ......................... | G01S 7/2813 342/131 |
| 7,688,257 B1 * | 3/2010 | Christianson | ......... | G01S 7/4052 342/134 |
| 8,232,907 B2 * | 7/2012 | Aarseth | ................. | G01S 13/904 342/25 R |
| 11,474,199 B2 | 10/2022 | Ruzanski et al. | | |
| 2005/0190100 A1 * | 9/2005 | Hester | ................... | G01S 7/4004 342/174 |
| 2011/0279307 A1 * | 11/2011 | Song | ..................... | G01S 13/282 342/134 |
| 2012/0139773 A1 * | 6/2012 | Misonoo | ............. | G01S 7/52004 342/22 |
| 2013/0342381 A1 * | 12/2013 | Nakagawa | .............. | G01S 7/292 342/90 |

(Continued)

FOREIGN PATENT DOCUMENTS

JP 2022028419 2/2022

OTHER PUBLICATIONS

"European Application Serial No. 24156122.4, Extended European Search Report mailed Jun. 13, 2024", 8 pgs.

(Continued)

*Primary Examiner* — Emmanuel Bayard
(74) *Attorney, Agent, or Firm* — Schwegman Lundberg & Woessner, P.A.

(57) ABSTRACT

Embodiments regard techniques for mitigating radio frequency interference (RFI) in weather data. A method includes receiving raw pulse returns, censoring the raw pulse returns to alter data of the raw pulse returns that is affected by the RFI resulting in censored pulse returns, compressing the censored pulse returns resulting in censored, compressed pulse returns, and transmitting, by an antenna, the censored, compressed pulse returns.

18 Claims, 6 Drawing Sheets

(56) References Cited

U.S. PATENT DOCUMENTS

| | | | |
|---|---|---|---|
| 2016/0202355 A1* | 7/2016 | Liu | G01S 13/931 |
| | | | 342/70 |
| 2017/0192088 A1* | 7/2017 | Fluhler | G01S 7/2922 |
| 2018/0275259 A1* | 9/2018 | Ott | G01S 13/5246 |
| 2021/0011125 A1* | 1/2021 | Massoud | G01S 15/04 |
| 2021/0208236 A1* | 7/2021 | John Wilson | G07C 5/008 |
| 2021/0231787 A1* | 7/2021 | Salazar Aquino | G01S 7/2886 |
| 2022/0120855 A1* | 4/2022 | Rosu | G01S 13/34 |
| 2022/0155432 A1* | 5/2022 | Du | G01S 13/343 |
| 2023/0168367 A1* | 6/2023 | Rosu | G01S 13/42 |
| | | | 342/93 |
| 2023/0258772 A1* | 8/2023 | Skow | G01S 7/415 |
| | | | 342/195 |
| 2023/0314560 A1* | 10/2023 | Wu | G01S 13/343 |
| | | | 342/173 |

OTHER PUBLICATIONS

Hu, Hang, "Study and Simulations on CFAR Detection in Pulse Doppler Radar Processor", 2006 7th International Symposium on Antennas, Propagation and Em Theory, (Apr. 30, 2007), 4 pgs.

"European Application Serial No. 24156122.4, Response filed Jan. 10, 2025 to Extended European Search Report mailed Jun. 13, 2024", 11 pgs.

\* cited by examiner

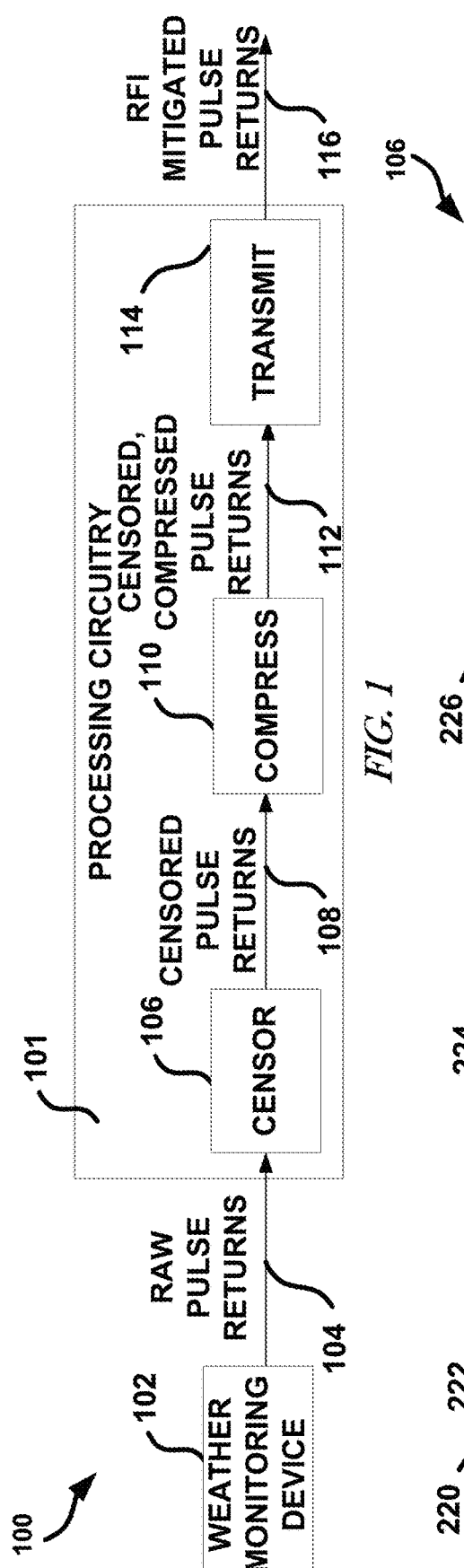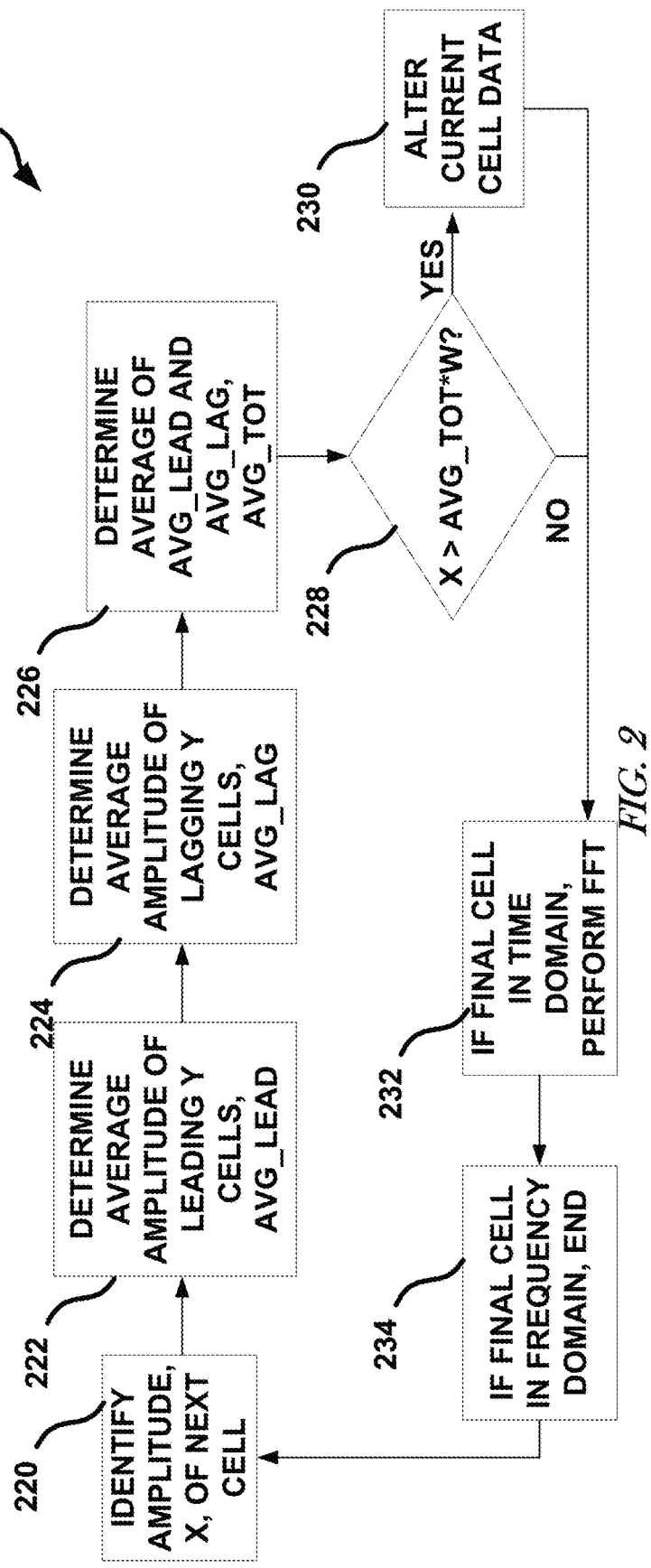

RADIO FREQUENCY INTERFERENCE MITIGATION IN WEATHER SENSING

TECHNICAL FIELD

Embodiments provide for improved weather data interpretation and presentation by mitigating radio frequency interference (RFI) in pulse return data.

BACKGROUND

RFI in weather is generally addressed by comparing Range IQ from pulse to pulse. A majority of deployed weather radars, such as Weather Surveillance Radar-1988 Doppler (WSR-88D), Terminal Doppler Weather Radar (TDWR), and Deutscher Wetterdienst (DWD) have used short pulse methods based on Klystrons or magnetrons and are hence not pulse compressed. Signal processed returns are in Range and or Doppler domain.

BRIEF DESCRIPTION OF THE DRAWINGS

FIG. 1 illustrates, by way of example, a diagram of an embodiment of a system for RFI mitigation in weather data.

FIG. 2 illustrates, by way of example, a diagram of an embodiment of the operation 106 (of FIG. 1).

DETAILED DESCRIPTION

Figure 3:
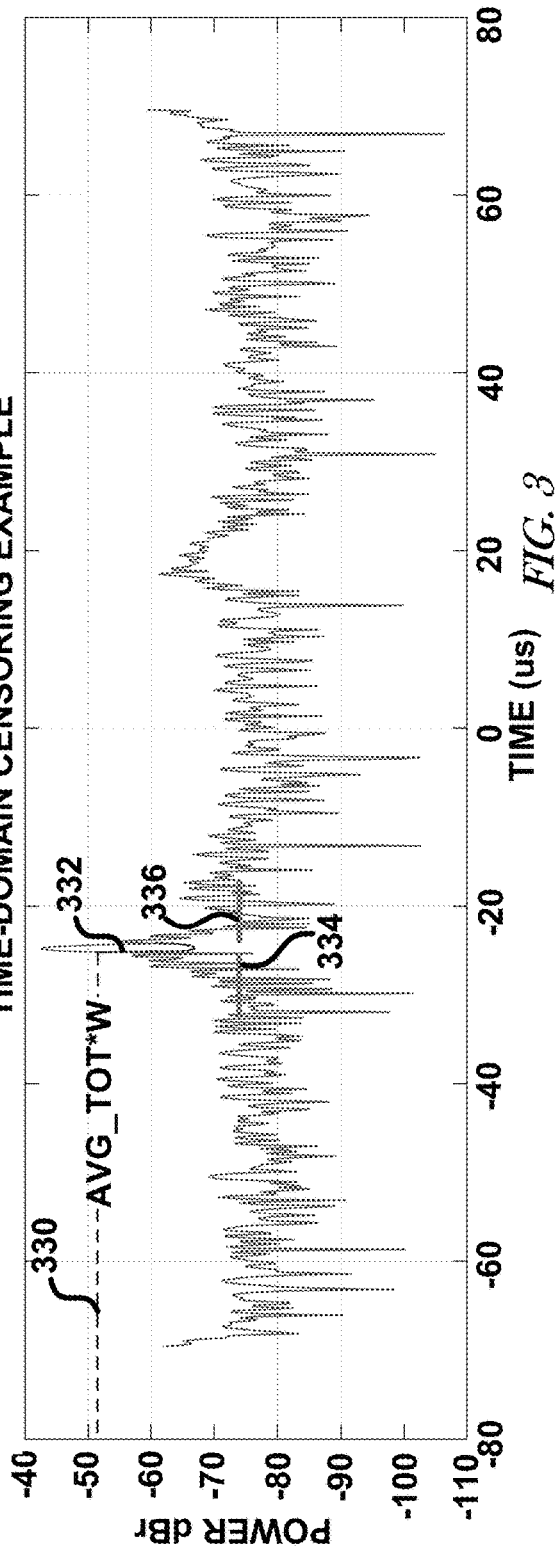
FIG. 3 illustrates, by way of example, a graph that helps illustrate the operation 106 (of FIG. 1) in the time domain.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Prior attempts by weather researchers to mitigate RFI have not focused on pre-pulse compression mitigation. RFI interferes with weather processing in a unique manner because the weather target is distributed in range and Doppler. RFI can have the effect of elevating a noise floor over range-Doppler space making quantifying the presence and properties of weather difficult. RFI, in accord with embodiments, is mitigated by removing it before pulse compression. The RFI can first be identified in the time domain to remove short time duration interference. Additional RFI can second be identified and mitigated in the frequency domain to remove narrow band interference.

Weather radars that utilize solid state technology that employ pulse compression are candidates for improved pulse compression performance. Prior to pulse compression, short pulse interference is highly concentrated in time. After pulse compression this energy is spread out over range increasing the noise level of the return making the interference hard to detect. This is because a pulse compression filter effectively randomizes the frequency components of the interference. Additionally, narrow band interference, such as a long duration continuous wave (CW) tone, can be easily removed in the frequency domain, whereas in the time domain before or after pulse compression, this narrow band energy is spread over range.

Examination and censoring (and sometimes replacing) of weather radar return signal values before pre-pulse compression helps improve the weather data. The improvements are from removing outlier data and replacing with data that is consistent with non-outlier data or removing the data. As discussed in the Background, weather radar has historically been developed around klystron/magitron short pulsed systems where the return is not pulse compressed. Therefore RFI mitigation technologies have evolved in the range/pulse domain rather than before pulse compression.

A solution of embodiments is unique in that they are capable of removing inference energy that is concentrated in time, frequency, or a combination thereof. Current post pulse compression techniques or techniques for non-pulsed compressed radars struggle because the energy is often spread over large range intervals making RFI detection and removal difficult. The method of embodiments is applied pulse-by-pulse, such as in real time. If the energy is concentrated in time/frequency it can be eliminated, and even replaced in at least some instances, with little distortion of the return data. Larger number of interfered with cells may possibly be replaced with data values from adjacent cells. Additionally, detection of the presence of interference is pretty straightforward precompression.

Embodiments employ a data censoring technique that, when enabled by command or by default, is performed in the time domain, frequency domain, or a combination thereof, prior to weighting and application of the matched filter and following digital beamforming. The matched filter and digital beam forming can be performed using known techniques.

Censoring can operate as follows:

A cell with an I, Q value amplitude, X, is censored if
X>W*Factor where Factor is provided by a user or is otherwise pre-defined, and W is a root mean square (RMS) mean of Y cells computed as follows:

AVG_LEAD: Leading average, Y cells
AVG_LAG: Lagging average, Y cells
AVG_TOT: Mean of leading and lagging cells.

Select leading or lagging cells if bin to be censored is at edge of time or frequency range depending on whether the censoring is currently being performed in the time or frequency domain, respectively.

Censoring can be enabled/disabled by waveform type, such as long or short pulse waveform. The censored value can be set equal to W*exp(jangle(X)). If the number of consecutive censored cells is greater than N where N is provided by a user or is otherwise pre-defined, a status message identifying the cells can be provided.

FIG. 1 illustrates, by way of example, a diagram of an embodiment of a system 100 for RFI mitigation in weather data. The system 100 as illustrated includes a weather parameter monitoring device 102 and processing circuitry 101. The weather parameter monitoring device 102 can include one or more sensors that provide a complex-valued base band signal. The sensor can be, for example, a radar that is part of a ground-based, solid-state radar. The data is typically transmitted, by the device, as raw pulse returns 104 in (I, Q) format. The I component represents an amplitude of a real part of a sample. The Q component represents an amplitude of an imaginary part of a sample. Each of the I and Q are typically transmitted in reference to a constellation for a modulation type used to modulate the data onto the baseband.

The weather monitoring device 102 provides the raw pulse returns 104 to the processing circuitry 101. The processing circuitry 101 can include one or more resistors, transistors, capacitors, diodes, inductors, power supplies, memory devices, processing devices (e.g., central processing unit, field programmable gate array (FPGA), application specific integrated circuit (ASIC), graphics processing unit (GPU), or the like), logic gates (e.g., AND, OR, XOR, negate, buffer, or the like), switches, multiplexers, analog to digital converters, digital to analog converters, phase locked loops, amplifiers, a combination thereof, or the like. Instead of monitoring weather, the device 102 can monitor ground vehicles, water vehicles, air traffic for an air traffic control, or the like.

The processing circuitry 101 implements a censor operation 106, a compress operation 110, and a beamform operation 114. Note that the beamforming operation may take place before or after censoring depending on the implementation. The censor operation 106 performs RFI mitigation on the data 104. The censor operation 106 removes RFI from the data 104 in the time domain, frequency domain, or a combination thereof. An iterative RFI mitigation technique that can be implemented by the censor operation 106 is illustrated in FIG. 2. A result of the operation 106 is censored pulse returns 108. The censored pulse returns 108 can be provided as input to the compress operation 110.

The compress operation 110 can include matched filtering of the censored pulse returns 108. Matched filtering is obtained by correlating a known delayed signal, or "template", with an unknown signal to detect the presence of the template in the unknown signal. This is equivalent to convolving the unknown signal with a complex conjugated time-reversed version of the template. The matched filter is the optimal linear filter for maximizing the signal-to-noise ratio (SNR) in the presence of additive stochastic noise.

A result of the compression operation 110 is censored, compressed pulse returns 112. The censored, compressed pulse returns 112 can be input into a beamforming, or other transmit operation 114. What is transmitted is RFI mitigated pulse returns 116. The transmit operation 114 can include modulating the data 112 onto a signal and transmitting the modulated waveform to a receiving device.

FIG. 2 illustrates, by way of example, a diagram of an embodiment of the operation 106. The operation 106 as illustrated includes binning the pulse returns 104. Binning the pulse returns 104 in time domain means separating the samples in time. The number of samples will depend on a sample rate and a length of time over which the samples are obtained. Binning the pulse returns 104 in frequency domain means separating the samples by ranges of frequency. Each bin represents an amplitude for a range of the frequencies. Each bin is sometimes called a cell. The operation 106 can be performed, first in the time domain, then, second, in the frequency domain. The operation 106 starts at a first cell and moves iteratively through each successive cell in order.

At operation 220, an amplitude, X, of a next cell is identified. The amplitude can be determined using a known technique that considers both the I and Q components of the data 104. At operation 222, an average amplitude of the leading Y cells, AVG_LEAD is determined. Y is an integer greater than one and may be placed ahead of cell under test by some number of cell gaps (e.g., two, three, four, or more cells away from the cell under test). Leading cells are those associated with an index greater than the current cell being tested. For example, if an index of the current cell is 5, leading cells are those with an index greater than 5. If Y is three, and the current cell is 5, then cells with indices 6, 7, and 8 can be used to determined AVG_LEAD at operation 222.

At operation 224, an average amplitude of the lagging Y cells, AVG_LAG is determined. Lagging cells are those associated with an index less than the current cell being tested and may be spaced by some gap in cells away from the cell under test (e.g., two, three, four, or more cells away from the cell under test). For example, if an index of the current cell is 5, lagging cells are those with an index less than 5. If Y is three, and the current cell is 5, then cells with indices 2, 3, and 4 can be used to determine AVG_LAG at operation 224.

At operation 226, the average of the Y leading and Y lagging cells is determined as AVG_TOT. AVG_TOT can be determined as a standard average (e.g., (AVG_LEAD+AVG_LAG)/2), a root mean square (e.g., sqrt((AVG_LEAD2+AVG_LAG$^2$)/2)), or other average.

At operation 228, it is determined whether the amplitude of the current cell (identified at operation 220) is greater than the average determined at operation 226 (e.g., times a weighting factor, Factor). If, at operation 228, the amplitude is greater than the average, the current cell data is altered at operation 230. Altering the current cell data can include setting to the average determined at operation 226, zero, or the like. If the duration (e.g., a specified continuous amount of time (equivalent to a specified number of consecutive samples) or a specified range of frequencies) of the amplitude being above the average is greater than a specified threshold, the operation 230 can include setting the amplitude to zero. If the duration of the amplitude being above the average is less than (or equal to) the specified threshold, the operation 230 can include setting the amplitude to the average determined at operation 222, 224, or 226.

At operation 232, the operation 106 changes from a time domain analysis to a frequency domain analysis. The pulse returns 104 is first analyzed in the time domain. Each cell of the pulse returns 104 is analyzed to identify RFI in an iterative manner. After all the cells are analyzed in the time domain and some of the data is altered resulting in time domain RFI mitigated data, a Discrete Fourier Transform (DFT), Fast Fourier Transform (FFT), or the like, can be performed on the time domain RFI mitigated data. The operation 106 is then repeated over all cells of data in the frequency domain. At operation 234, if the final cell in the frequency domain has been analyzed and RFI mitigated using the operation 106, the operation 106 ends. The data produced using the operation 106 is the censored pulse returns 108. When data in a cell is censored (altered using the operation 106), the new value for the cell can be used to determine any of the averages of the operations 222, 224, 226.

FIG. 3 illustrates, by way of example, a graph that helps illustrate the operation 106 in the time domain. A dashed line 330 represents the average determined at the operation 226 for the current cell and multiplied by the weight. A second dashed line 332 represents the change to the value of the current cell after censoring. A solid line 334 represents AVG_LAG, the average determined at operation 224. A width of the line 334 represents the cells that are used to determine the AVG_LAG. A solid line 336 represents AVG_LEAD, the average determined at operation 222. A width of the line 336 represents the cells that are used to determine the AVG_LEAD. The data of the cell is censored since the data of the current cell is greater than the average determined at operation 226 multiplied by the weight.

Figure 4:
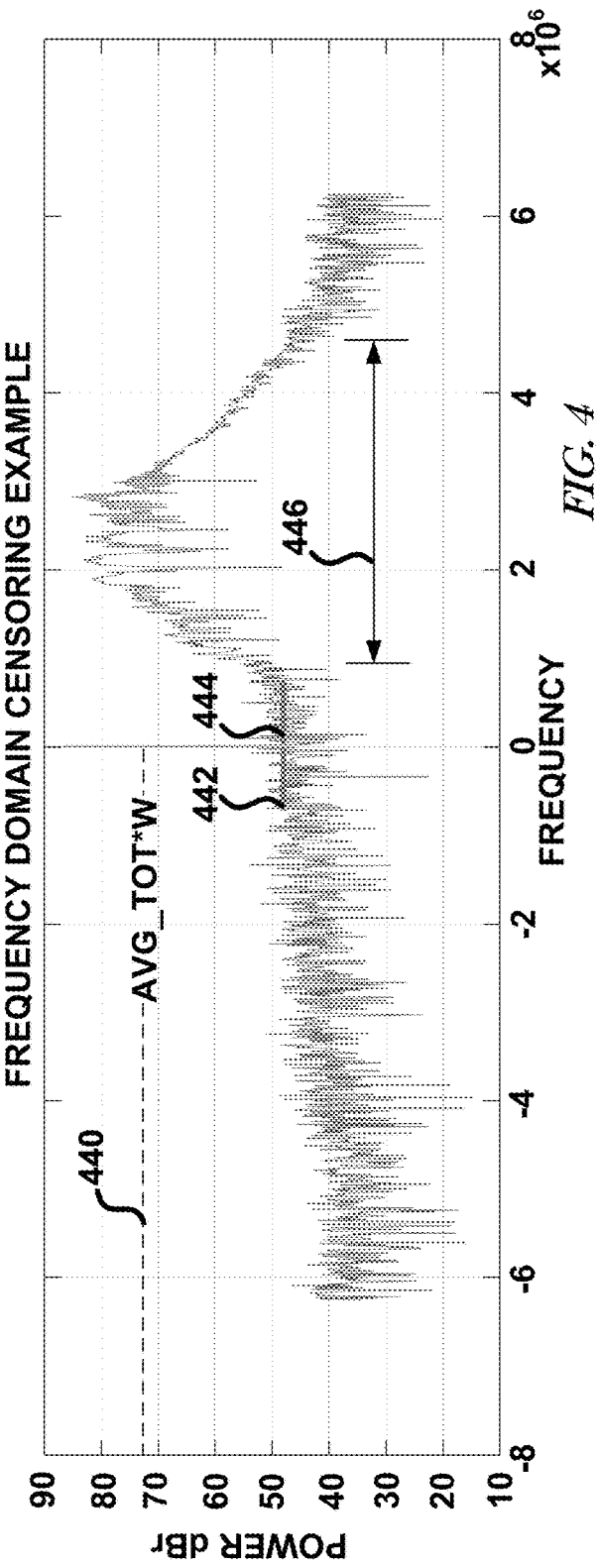
FIG. 4 illustrates, by way of example, a graph that helps illustrate the operation 106 (of FIG. 1) in the frequency domain.

FIG. 4 illustrates, by way of example, a graph that helps illustrate the operation 106 in the frequency domain. A dashed line 440 represents the average determined at the operation 226 for the current cell and multiplied by the weight. A solid line 442 represents AVG_LAG, the average determined at operation 224. A width of the line 442 represents the cells that are used to determine the AVG_LAG. A solid line 444 represents AVG_LEAD, the average determined at operation 222. A width of the line 444 represents the cells that are used to determine the AVG_LEAD. The data of the cell is censored since the data of the current cell is greater than the average determined at operation 226 multiplied by the weight. One or more of the cells in range indicated by double arrow 446 can be censored using the operation 106. Since the duration of the cells that are elevated in the range indicated by the double arrow 446 is greater than a specified threshold number of cells, those cells can be censored by replacing their values with "0" or some other constant.

Figure 5:
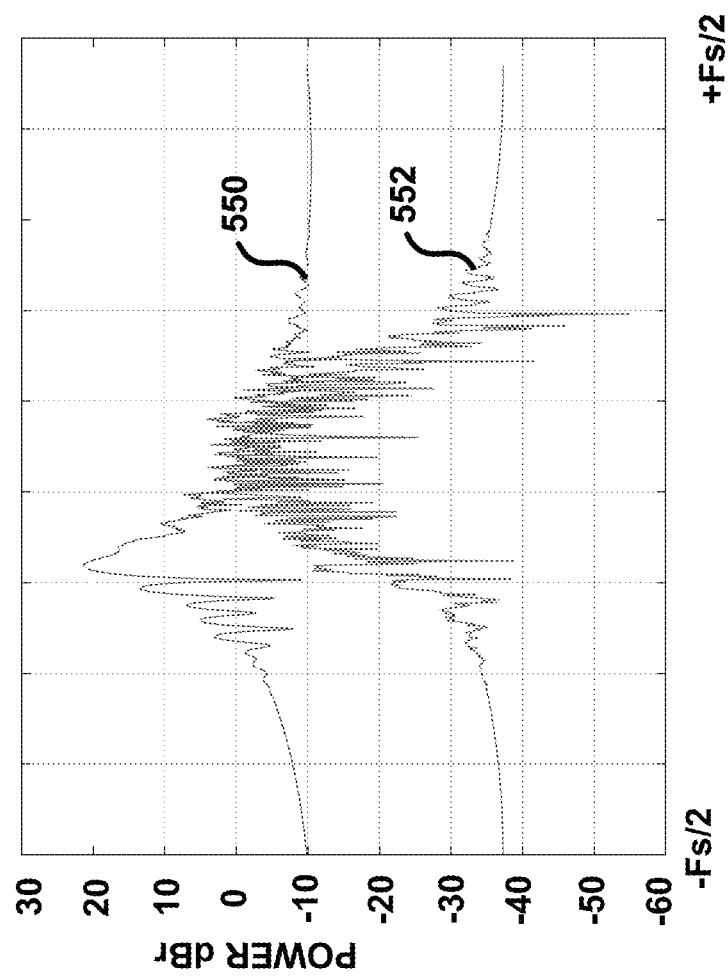
FIG. 5 illustrates, by way of example, a graph of some lines that help distinguish between when values can be censored to a non-zero value and when value can be censored to a zero value (sometimes called "removal").

FIG. 5 illustrates, by way of example, a graph of some lines that help distinguish between when values can be censored to a non-zero value and when value can be censored to a zero value (sometimes called "removal"). A first line 552 includes some interference in a central region of a peak of the line 552. Since the data is expected to be returned with a lower power than −10 dB, the data of the line 552 can be censored to a reasonable value based on the AVG_LAG, AVG_LEAD, or a combination thereof. The data in the line 550, in contrast, includes so much interference that recovering the original signal is not possible. In such instances, the corresponding pulse returns 550 can be removed, possibly flagged, and not further processed as weather data.

Figure 6:
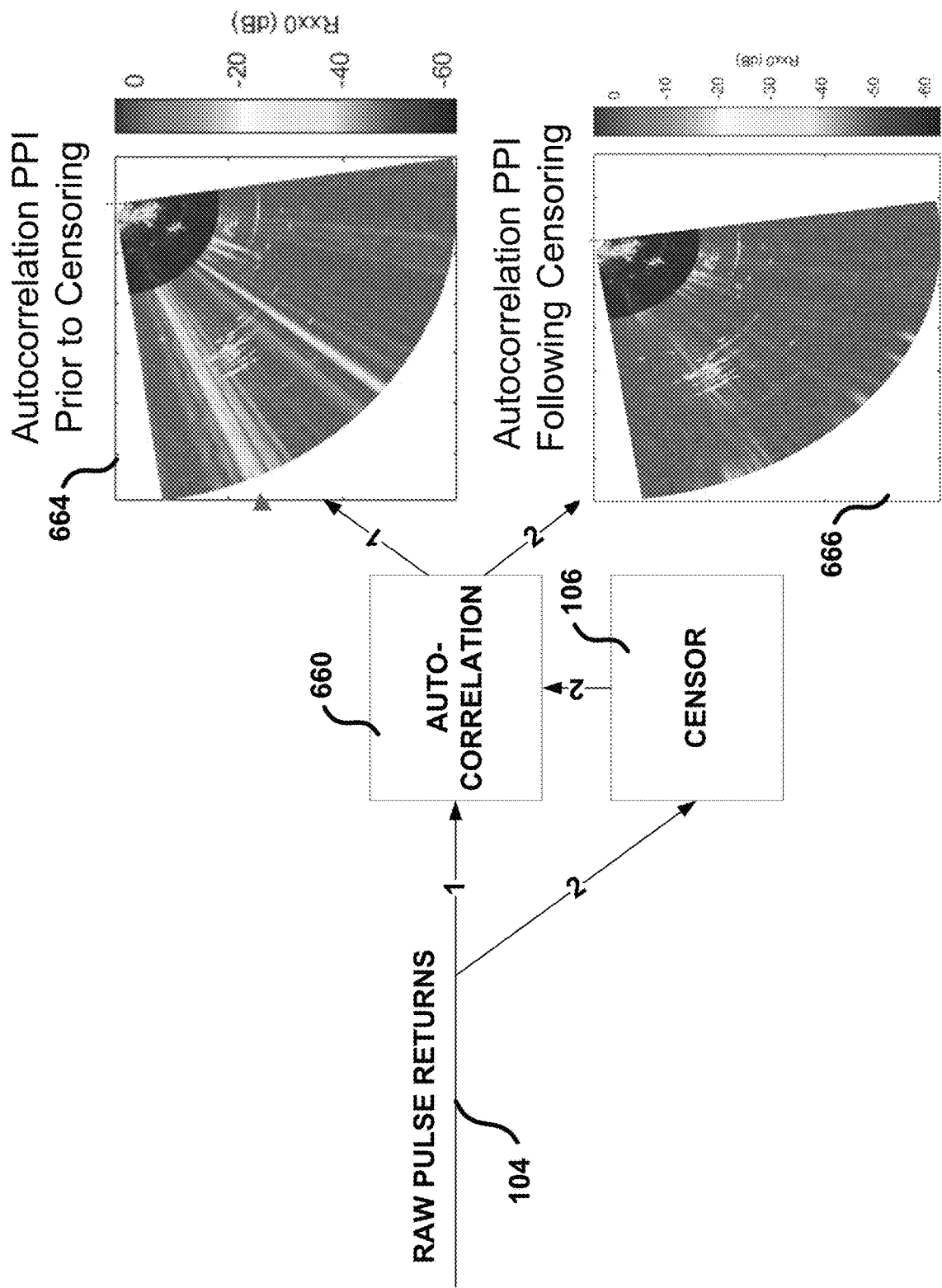
FIG. 6 illustrates, by way of example, a diagram illustrating improvements in weather data via censoring of pulse returns (operation 106 in FIG. 1).

FIG. 6 illustrates, by way of example, a diagram illustrating improvements in weather data via censoring (operation 106) of pulse returns. The pulse returns 104 of FIG. 6 takes two separate paths to illustrate the improvement. A first path, labeled "1", operates, by an auto-correlation operation 660, on the raw pulse returns 104 (no censoring). The result is radar weather data 664 that is relatively noisy. Using the relatively noisy radar weather data 664, it is more difficult to discern the bounds of the weather present in the radar.

A second path, labeled "2", operates, by the censor operation 106, on the raw pulse returns 104. Performing the operation 106 detects and removes data affected by RFI. The result of the operation 106, the censored pulse returns 108, is then provided to the auto-correlation operation 660. Censored weather data 666 that results from the second path is less noisy than the data 664 without censoring. The result is that using the data 666, it is easier to discern the bounds of the weather. Mission plans (e.g., flights or other air vehicle travel, ground travel, water travel, device operation, or the like) can be dependent on the weather data 664 or 666. Using the noisy data 664, a device, vehicle, or other asset may not be deployed because the bounds of the actual weather are unknown and may pose too much risk. Using the censored data 666, a device, vehicle, or other asset may be more confidently deployed because the bounds of the actual weather are more clear.

Figure 7:
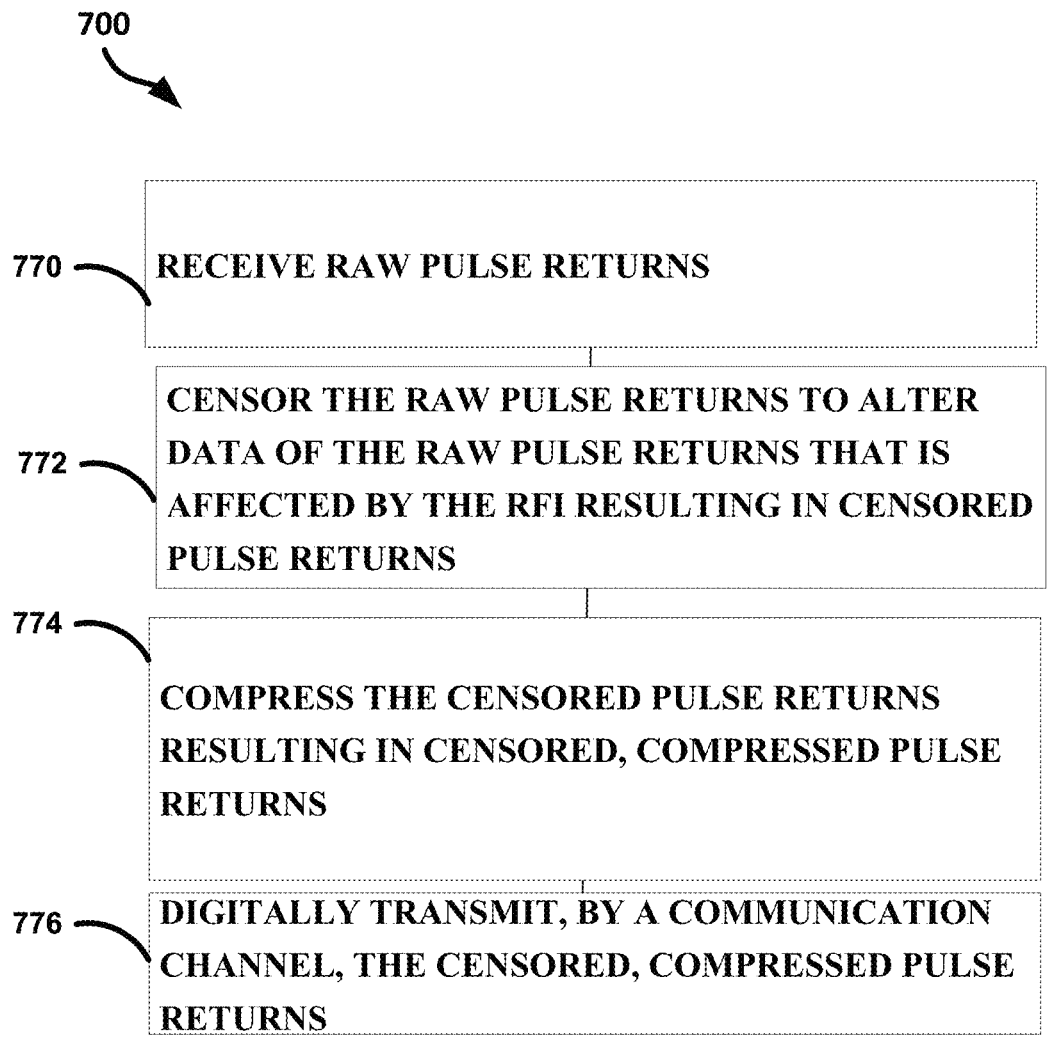
FIG. 7 illustrates, by way of example, a diagram of an embodiment of a method for mitigating RFI in weather data.

FIG. 7 illustrates, by way of example, a diagram of an embodiment of a method 700 for RFI mitigation in weather data. The method 700 as illustrated includes receiving raw pulse returns, at operation 770; censoring the raw pulse returns to alter data of the raw pulse returns that is affected by the RFI resulting in censored pulse returns, at operation 772; compressing the censored pulse returns resulting in censored, compressed pulse returns, at operation 774; and digitally transmitting the censored, compressed pulse returns (I, Q weather data) to a weather processing function, at operation 776. The weather processing function converts the censored, compressed pulse returns to human understandable weather information.

The operation 774 can further include, in time domain, comparing an amplitude of a current cell to an average amplitude of a specified number of cells that are directly adjacent to the current cell, in time. The average amplitude of the specified number of directly adjacent cells can include cells that lead the current cell in time and cells that lag the current cell in time.

The operation 774 can further include setting a value of the current cell to an average of (i) the specified number of directly adjacent leading cells, (ii) the specified number of directly adjacent lagging cells, or (iii) a combination thereof. The method 700 can further include performing a fast Fourier transform on the censored pulse returns to generate censored pulse returns in a frequency domain. The method 700 can further include further censoring the censored pulse returns, in the frequency domain, by comparing an amplitude of a current cell to an average amplitude of a specified number of cells that are directly adjacent to the current cell, in frequency. The method 700 can further include, wherein the average amplitude of the specified number of directly adjacent cells includes cells that lead the current cell in frequency and cells that lag the current cell in frequency.

The operation 774 can further include, wherein censoring the raw pulse returns includes setting a value of the current cell to an average of (i) the specified number of directly adjacent leading cells, (ii) the specified number of directly adjacent lagging cells, (iii) a combination thereof, or (iv) zero.

Figure 8:
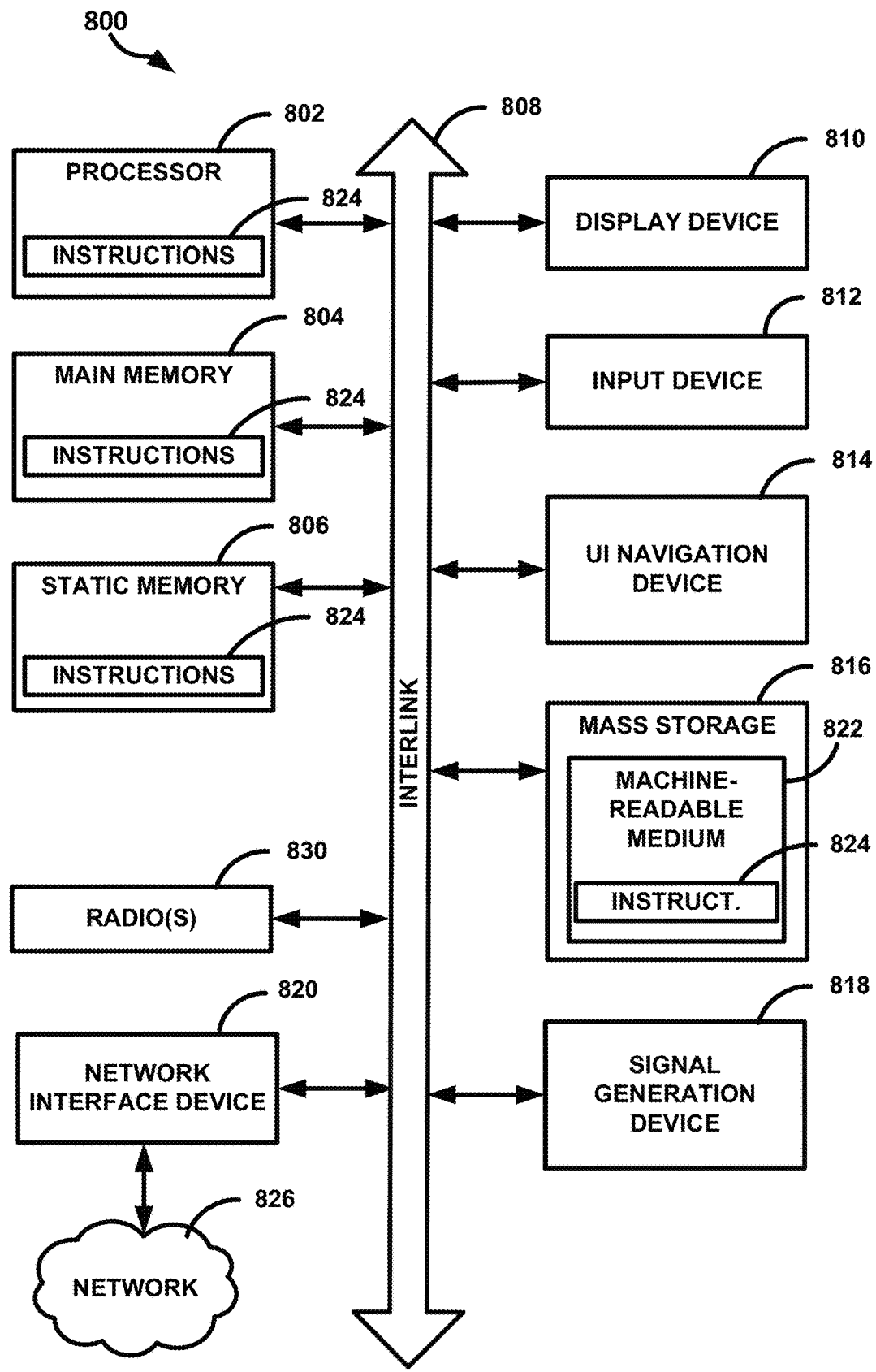
FIG. 8 illustrates, by way of example, a block diagram of an embodiment of a machine in the example form of a computer system within which instructions, for causing the machine to perform any one or more of the methods discussed herein, may be executed.

FIG. 8 illustrates, by way of example, a block diagram of an embodiment of a machine in the example form of a computer system 800 within which instructions, for causing the machine to perform any one or more of the methods discussed herein, may be executed. One or more of the system 100, operations of the processing circuitry 101, or method 700 can include, or be implemented or performed by one or more of the components of the computer system 800. In a networked deployment, the machine may operate in the capacity of a server or a client machine in server-client network environment, or as a peer machine in a peer-to-peer (or distributed) network environment. The machine may be a personal computer (PC), server, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a mass storage unit 816, a signal generation device 818 (e.g., a speaker), a network interface device 820, and a radio 830 such as Bluetooth, WWAN, WLAN, and NFC, permitting the application of security controls on such protocols.

The mass storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a device comprising processing circuitry, a memory including instructions that, when performed by the processing circuitry, cause the processing circuitry to perform operations for radio frequency interference (RFI) mitigated weather data, the operations comprising receiving raw pulse returns, censoring the raw pulse returns to alter data of the raw pulse returns that is affected by the RFI resulting in censored pulse returns, and compressing the censored pulse returns resulting in censored, compressed pulse returns, and a communication channel configured to receive the censored, compressed pulse returns and digitally transmit the censored, compressed pulse returns.

In Example 2, Example 1 further includes, wherein censoring the raw pulse returns includes, in time domain, comparing an amplitude of a current cell to an average amplitude of a specified number of cells that are directly adjacent to the current cell, in time.

In Example 3, Example 2 further includes, wherein the average amplitude of the specified number of directly adjacent cells includes cells that lead the current cell in time and cells that lag the current cell in time.

In Example 4, Example 3 further includes, wherein censoring the raw pulse returns includes setting a value of the current cell to an average of (i) the specified number of directly adjacent leading cells, (ii) the specified number of directly adjacent lagging cells, or (iii) a combination thereof.

In Example 5, at least one of Examples 2-4 further includes, wherein the operations further comprise performing a fast Fourier transform on the censored pulse returns to generate censored pulse returns in a frequency domain.

In Example 6, Example 5 further includes, wherein the operations further comprise further censoring the censored pulse returns, in the frequency domain, by comparing an amplitude of a current cell to an average amplitude of a specified number of cells that are directly adjacent to the current cell, in frequency.

In Example 7, Example 6 further includes, wherein the average amplitude of the specified number of directly adjacent cells includes cells that lead the current cell in frequency and cells that lag the current cell in frequency.

In Example 8, Example 7 further includes, wherein censoring the raw pulse returns includes setting a value of the current cell to an average of (i) the specified number of directly adjacent leading cells, (ii) the specified number of directly adjacent lagging cells, (iii) a combination thereof, or (iv) zero.

Example 9 includes a method for generating radio frequency interference (RFI) mitigated weather data, the operations comprising receiving raw pulse returns, censoring the raw pulse returns to alter data of the raw pulse returns that is affected by the RFI resulting in censored pulse returns, compressing the censored pulse returns resulting in censored, compressed pulse returns, and digitally transmitting the censored, compressed pulse returns.

In Example 10, Example 9 further includes, wherein censoring the raw pulse returns includes, in time domain, comparing an amplitude of a current cell to an average amplitude of a specified number of cells that are directly adjacent to the current cell, in time.

In Example 11, Example 10 further includes, wherein the average amplitude of the specified number of directly adjacent cells includes cells that lead the current cell in time and cells that lag the current cell in time.

In Example 12, Example 11 further includes, wherein censoring the raw pulse returns includes setting a value of the current cell to an average of (i) the specified number of directly adjacent leading cells, (ii) the specified number of directly adjacent lagging cells, or (iii) a combination thereof.

In Example 13, at least one of Examples 10-12 further includes performing a fast Fourier transform on the censored pulse returns to generate censored pulse returns in a frequency domain.

In Example 14, Example 13 further includes further censoring the censored pulse returns, in the frequency domain, by comparing an amplitude of a current cell to an average amplitude of a specified number of cells that are directly adjacent to the current cell, in frequency.

In Example 15, Example 14 further includes, wherein the average amplitude of the specified number of directly adjacent cells includes cells that lead the current cell in frequency and cells that lag the current cell in frequency.

In Example 16, Example 15 further includes, wherein censoring the raw pulse returns includes setting a value of the current cell to an average of (i) the specified number of directly adjacent leading cells, (ii) the specified number of directly adjacent lagging cells, (iii) a combination thereof, or (iv) zero.

Example 17 includes a non-transitory machine-readable medium including instructions that, when executed by a machine, cause the machine to perform the method of one of Examples 9-16.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device comprising:
    processing circuitry;
    a memory including instructions that, when performed by the processing circuitry, cause the processing circuitry to perform operations for radio frequency interference (RFI) mitigated weather pulse returns, the operations comprising:
    receiving raw pulse returns from a weather radar;
    censoring the raw pulse returns in a frequency domain, by removing, altering, and replacing the raw pulse returns that are affected by the RFI resulting in censored pulse returns, wherein censoring includes comparing an amplitude of a current cell to an average amplitude of a specified number of cells that are directly adjacent to the current cell; and
    compressing the censored pulse returns resulting in censored, compressed pulse returns; and
    a channel configured to digitally transmit the censored, compressed pulse returns.

2. The device of claim 1, wherein the operations further comprise censoring the raw pulse returns in a time domain, wherein the censoring includes comparing an amplitude of a current cell to an average amplitude of a specified number of cells that are directly adjacent to the current cell, in time.

3. The device of claim 2, wherein the average amplitude of the specified number of directly adjacent cells includes cells that lead the current cell in time and cells that lag the current cell in time.

4. The device of claim 3, wherein censoring the raw pulse returns in the time domain includes setting a value of the current cell to an average of (i) the specified number of directly adjacent leading cells, (ii) the specified number of directly adjacent lagging cells, or (iii) a combination thereof.

5. The device of claim 2, wherein the operations further comprise performing a fast Fourier transform on the censored pulse returns in the time domain to generate censored pulse returns in a frequency domain.

6. The device of claim 1, wherein the average amplitude of the specified number of directly adjacent cells includes cells that lead the current cell in frequency and cells that lag the current cell in frequency.

7. The device of claim 6, wherein censoring the raw pulse returns in the frequency domain includes setting a value of the current cell to an average of (i) the specified number of directly adjacent leading cells, (ii) the specified number of directly adjacent lagging cells, (iii) a combination thereof, or (iv) zero.

8. A method for generating radio frequency interference (RFI) mitigated weather data, the operations comprising:
   receiving raw pulse returns;
   censoring the raw pulse returns in a frequency domain by removing, altering, and replacing the raw pulse returns that are affected by the RFI resulting in censored pulse returns, wherein censoring includes comparing an amplitude of a current cell to an average amplitude of a specified number of cells that are directly adjacent to the current cell; and
   compressing the censored pulse returns resulting in censored, compressed pulse returns; and
   digitally transmitting the censored, compressed pulse returns.

9. The method of claim 8, wherein the operations further comprise censoring the raw pulse returns in a time domain, wherein the censoring includes comparing an amplitude of a current cell to an average amplitude of a specified number of cells that are directly adjacent to the current cell, in time.

10. The method of claim 9, wherein the average amplitude of the specified number of directly adjacent cells includes cells that lead the current cell in time and cells that lag the current cell in time.

11. The method of claim 10, wherein censoring the raw pulse returns in the time domain includes setting a value of the current cell to an average of (i) the specified number of directly adjacent leading cells, (ii) the specified number of directly adjacent lagging cells, or (iii) a combination thereof.

12. The method of claim 9, further comprising performing a fast Fourier transform on the censored pulse returns in time domain to generate censored pulse returns in a frequency domain.

13. The method of claim 8, wherein the average amplitude of the specified number of directly adjacent cells includes cells that lead the current cell in frequency and cells that lag the current cell in frequency.

14. The method of claim 13, wherein censoring the raw pulse returns in the frequency domain includes setting a value of the current cell to an average of (i) the specified number of directly adjacent leading cells, (ii) the specified number of directly adjacent lagging cells, (iii) a combination thereof, or (iv) zero.

15. A non-transitory machine-readable medium including instructions that, when executed by a machine, cause the machine to perform operations for generating radio frequency interference (RFI) mitigated weather data, the operations comprising:
   receiving raw pulse returns;
   censoring the raw pulse returns in a frequency domain by removing, altering, and replacing the raw pulse returns that are affected by the RFI resulting in censored pulse returns, wherein censoring includes comparing an amplitude of a current cell to an average amplitude of a specified number of cells that are directly adjacent to the current cell; and
   compressing the censored pulse returns resulting in censored, compressed pulse returns; and
   digitally transmitting the censored, compressed pulse returns.

16. The non-transitory machine-readable medium of claim 15, wherein the operations further comprise censoring the raw pulse returns in a time domain, wherein the censoring includes comparing an amplitude of a current cell to an average amplitude of a specified number of cells that are directly adjacent to the current cell, in time.

17. The non-transitory machine-readable medium of claim 16, wherein the average amplitude of the specified number of directly adjacent cells includes cells that lead the current cell in time and cells that lag the current cell in time.

18. The non-transitory machine-readable medium of claim 16, wherein the operations further comprise:
   performing a fast Fourier transform on the censored pulse returns in the time domain to generate censored pulse returns in a frequency domain.

\* \* \* \* \*